United States Patent
Kanouda

(10) Patent No.: US 12,542,497 B2
(45) Date of Patent: Feb. 3, 2026

(54) POWER CONVERSION DEVICE, POWER CONVERSION SYSTEM, AND METHOD FOR CONTROLLING POWER CONVERSION DEVICE

(71) Applicant: HITACHI, LTD., Tokyo (JP)

(72) Inventor: Akihiko Kanouda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 259 days.

(21) Appl. No.: 18/560,971

(22) PCT Filed: Apr. 21, 2022

(86) PCT No.: PCT/JP2022/018469
§ 371 (c)(1),
(2) Date: Nov. 15, 2023

(87) PCT Pub. No.: WO2022/254994
PCT Pub. Date: Dec. 8, 2022

(65) Prior Publication Data
US 2024/0258932 A1    Aug. 1, 2024

(30) Foreign Application Priority Data
Jun. 2, 2021    (JP) ............................. JP2021-093198

(51) Int. Cl.
*H02M 7/25*      (2006.01)
*B60L 53/10*     (2019.01)
(Continued)

(52) U.S. Cl.
CPC .............. *H02M 7/25* (2013.01); *B60L 53/10* (2019.02); *H02M 1/007* (2021.05); *H02M 3/003* (2021.05);
(Continued)

(58) Field of Classification Search
CPC .. H02M 1/007; H02M 3/003; H02M 3/33584; H02M 7/25; H02M 7/2173; B60L 53/10
See application file for complete search history.

(56) References Cited

U.S. PATENT DOCUMENTS

2006/0233000 A1    10/2006 Akagi
2011/0291616 A1    12/2011 Kim et al.
(Continued)

FOREIGN PATENT DOCUMENTS

JP    2005-073362 A    3/2005
JP    2005-094874 A    4/2005
(Continued)

OTHER PUBLICATIONS

International Search Report of PCT/JP2022/018469 dated Jul. 12, 2022.

*Primary Examiner* — Gary L Laxton
(74) *Attorney, Agent, or Firm* — MATTINGLY & MALUR, PC

(57) ABSTRACT

The objective of the present invention is to reduce the manufacturing costs of an electric power converting device and to reduce the installation space thereof. An electric power converting device comprises: AC/DC converters and AC/DC converters connected in series to an alternating-current power supply; direct-current buses provided on an output side; change-over switches, change-over switches, change-over switches, and change-over switches for selectively connecting the AC/DC converters and the AC/DC converters to each direct-current path; a bus-to-bus connecting switch connecting the direct-current buses in series; and a switch for connecting an electric circuit connected in series by means of the bus-to-bus connecting switch to a load.

13 Claims, 7 Drawing Sheets

(51) Int. Cl.
  *H02M 1/00*    (2006.01)
  *H02M 3/00*    (2006.01)
  *H02M 3/335*   (2006.01)
  *H02M 7/217*   (2006.01)

(52) U.S. Cl.
  CPC ..... *H02M 3/33584* (2013.01); *H02M 7/2173* (2013.01)

(56) References Cited

U.S. PATENT DOCUMENTS

| | | | | |
|---|---|---|---|---|
| 2018/0162229 | A1* | 6/2018 | Götz | H02J 7/0042 |
| 2019/0372465 | A1* | 12/2019 | Xu | H02M 3/33571 |
| 2020/0006970 | A1* | 1/2020 | Chen | H02M 7/217 |
| 2020/0091831 | A1* | 3/2020 | Kadota | H02M 5/4585 |
| 2022/0118864 | A1* | 4/2022 | Zhang | B60L 53/14 |
| 2023/0130296 | A1* | 4/2023 | Liu | H02M 1/4241 363/17 |
| 2024/0039414 | A1* | 2/2024 | Kikuchi | B60L 53/67 |
| 2024/0372476 | A1* | 11/2024 | Kumar | H02M 3/01 |

FOREIGN PATENT DOCUMENTS

| | | | |
|---|---|---|---|
| JP | 2012-518987 | A | 8/2012 |
| JP | 2020-178391 | A | 10/2020 |
| JP | 2020-182257 | A | 11/2020 |
| JP | 2021-069168 | A | 4/2021 |

* cited by examiner

POWER CONVERSION DEVICE, POWER CONVERSION SYSTEM, AND METHOD FOR CONTROLLING POWER CONVERSION DEVICE

TECHNICAL FIELD

The present invention relates to a power conversion device, a power conversion system, and a method for controlling a power conversion device.

BACKGROUND ART

In recent years, electrification has been accelerated in various fields. In particular, regarding a moving body, electrification of a bus, a truck, and a construction machine is shifting to a practical application stage following an electric vehicle. On the other hand, there is an increasing demand also for a charging system that supplies electric energy to these electrified moving bodies from the ground side. In order to introduce the electrified moving body, it is desired to enhance also a charging system on the ground side. In order to shorten the charging waiting time of the user, it is preferable to provide a device including a plurality of charging terminals. In addition, it is preferable that the charging voltage and current can be widely supplied according to a vehicle type or a user's request. Furthermore, it is preferable to reduce the installation space of the charging system.

For example, claim 1 of the following PTL 1 describes "A universal charging device, the device comprising: a charging pack including at least one of an AC terminal for inputting an AC power, an AC/DC converter for rectifying the AC power to a DC power, a DC terminal for outputting a DC power of a first power value, and a charging pack switch for turning on/off an output of the DC power, wherein a DC power of various power values in which the first power value increases or decreases can be outputted in response to increase/decrease in installation number of the charging packs and to whether each charging pack switch is turned on or off, and a charging speed of an electric vehicle can be adjusted in response to changes in power value of the DC power.".

CITATION LIST

Patent Literature

PTL 1: JP 2012-518987 A

SUMMARY OF INVENTION

Technical Problem

As described above, in order to introduce and smoothly operate the electrified moving body, it is desired to also enhance the charging system on the ground side, and thus, it is desired to reduce the initial introduction cost of the charging system. However, since the voltage and capacity to be charged are widely varied (150 to 800 V, 50 to over 350 kW) depending on the vehicle type, the configuration of the converter becomes complicated and the cost increases.

The present invention has been made in view of the above circumstances, and an object of the present invention is to reduce the manufacturing cost of a power conversion device or a power conversion system and to reduce the installation space.

Solution to Problem

In order to solve the above-described problems, a power conversion device of the present invention includes: a plurality of isolated cell converters connected in series to a power supply; two or more DC paths provided on an output side; a DC path connection means configured to selectively connect each of the isolated cell converters to each of the DC paths; a series connection means configured to connect in series two or more of the DC paths; and a first load connection means configured to connect electric paths connected in series by the series connection means to a load.

A power conversion system of the present invention includes: a plurality of isolated cell converters connected in series to a power supply; two or more DC paths provided on an output side; a DC path connection means configured to selectively connect each of the isolated cell converters to each of the DC paths; a series connection means configured to connect in series two or more of the DC paths; and a first load connection means configured to connect the DC paths connected in series by the series connection means to a load.

A method for controlling a power conversion device of the present invention executes the steps of: of a plurality of DC paths provided on an output side, connecting in series two by a series connection means; of a plurality of isolated cell converters connected in series to a power supply, allocating and connecting n and m isolated cell converters to the respective DC paths by a DC path connection means; controlling a voltage ratio of each of the DC paths to be n:m; and connecting the DC paths connected in series to a load by a first load connection means.

Other means will be described in the mode for carrying out the invention.

Advantageous Effects of Invention

According to the present invention, it is possible to reduce the manufacturing cost of the power conversion device or the power conversion system and to reduce the installation space.

DESCRIPTION OF EMBODIMENTS

Hereinafter, modes for carrying out the present invention will be described in detail with reference to the drawings.

First Embodiment

Configuration of First Embodiment

A first embodiment of the present invention will be described with reference to FIGS. 1, 2, 3, and 4.

Figure 1:
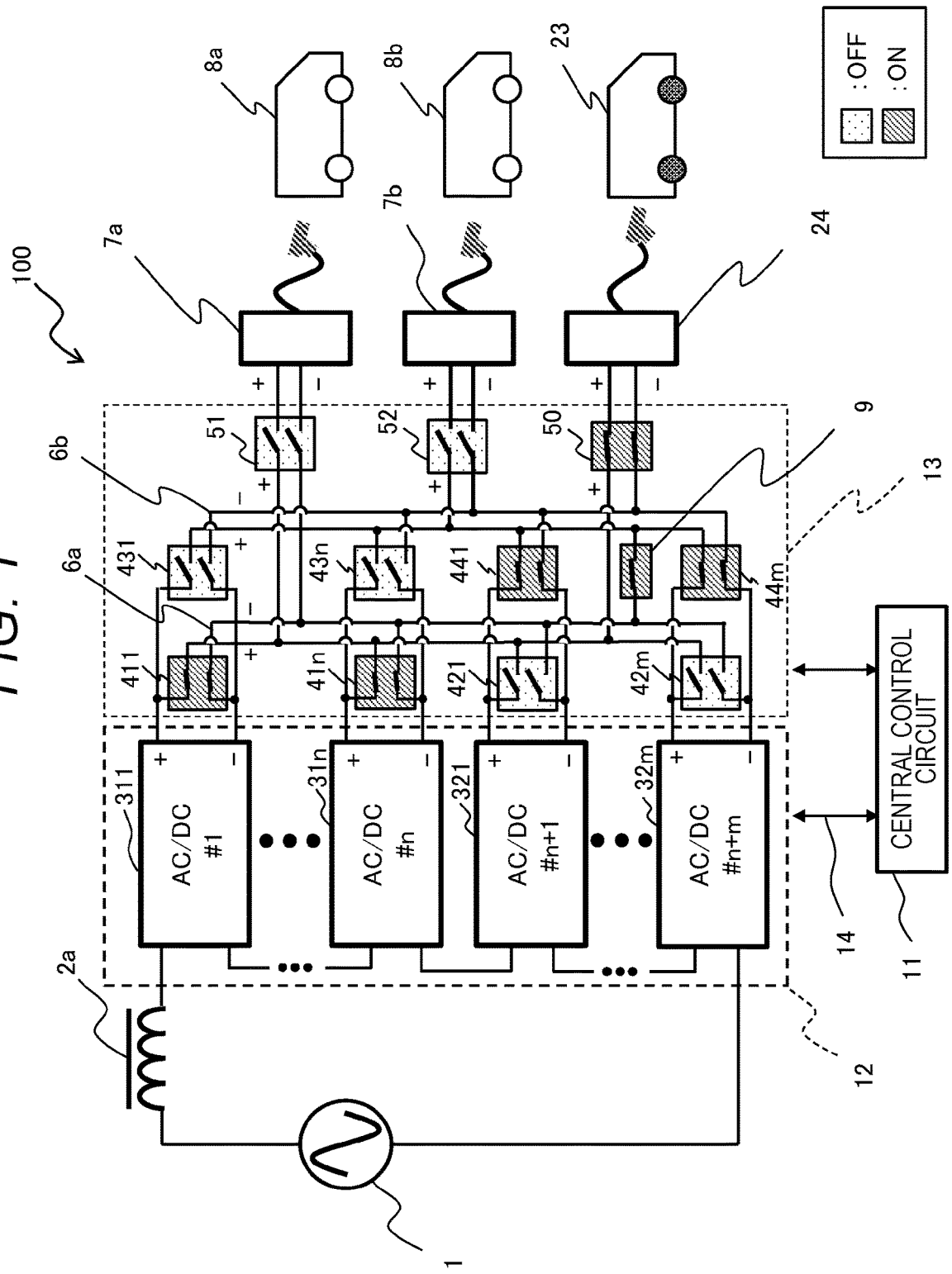
FIG. 1 is a configuration diagram of a power conversion device according to a first embodiment.

FIG. 1 is a configuration diagram of a power conversion device 100 according to the first embodiment.

In FIG. 1, the power conversion device 100 is connected to an AC power supply 1, charging terminals 7a and 7b, and a large-capacity charging terminal 24, and includes a reactor 2a, a power converter 12, a switching circuit 13, a central control circuit 11, and an optical cable 14. The power conversion device 100 causes the charging terminals 7a and 7b to charge the electric vehicles 8a and 8b, and causes the large-capacity charging terminal 24 to charge the large-capacity electric vehicle 23.

The reactor 2a is provided on a line connecting the power converter 12 to the AC power supply 1, and blocks a high-frequency current generated accompanying switching of the power converter 12 from flowing between the AC power supply 1 and the power converter 12.

The power converter 12 is connected to the AC power supply 1 through the reactor 2a. The power converter 12 includes n AC/DC converters 311 to 31n and m AC/DC converters 321 to 32m. The power converter 12 can convert the AC power of the AC power supply 1 into DC power, and can also perform a reverse conversion. The n AC/DC converters 311 to 31n and the m AC/DC converters 321 to 32m are a plurality of isolated cell converters connected in series to a power supply.

The switching circuit 13 includes changeover switches 411 to 41n, changeover switches 431 to 43n, changeover switches 421 to 42m, changeover switches 441 to 44m, switches 50 to 52, DC buses 6a and 6b, and an inter-bus connection switch 9. The switching circuit 13 switches the DC power of the power converter 12 described above to a desired voltage and supplies the voltage to the outside, and is connected to the charging terminals 7a and 7b.

The DC buses 6a and 6b are two or more DC paths provided on the output side of the power conversion device 100, and are integrally positive and negative lines independent of each other. The changeover switches 411 to 41n and the changeover switches 431 to 43n are DC path connection means that selectively connect the AC/DC converters 311 to 31n to the DC buses 6a and 6b. The changeover switches 421 to 42m and the changeover switches 441 to 44m are DC path connection means that selectively connect the AC/DC converters 321 to 32m to the DC buses 6a and 6b.

The inter-bus connection switch 9 is a series connection means that connects the DC buses 6a and 6b in series. The switch 50 is a first load connection means that connects the electrical paths connected in series by the inter-bus connection switch 9 to the large-capacity electric vehicle 23 as a load. The changeover switches 411 to 41n, the changeover switches 431 to 43n, the changeover switches 421 to 42m, the changeover switches 441 to 44m, the switches 50 to 52, and the inter-bus connection switch 9 are electromagnetic switches controlled by the central control circuit 11, but may be switches manually operated by an operator.

The switches 51 and 52 function as second load connection means for connecting the DC buses 6a and 6b to loads, respectively. The inter-bus connection switch 9 is a switch that conducts one negative electrode and the other positive electrode of the DC buses 6a and 6b.

The charging terminals 7a and 7b are terminals for charging the electric vehicles 8a and 8b. The large-capacity charging terminal 24 is a terminal for charging the large-capacity electric vehicle 23. The electric vehicles 8a and 8b and the large-capacity electric vehicle 23 include secondary batteries.

A configuration of the power converter 12 in FIG. 1 will be described. The AC power supply 1 is connected to the power converter 12 through the reactor 2a. Terminals on the AC power supply 1 side of all the AC/DC converters 311 to 31n and terminals on the AC power supply 1 side of all the AC/DC converters 321 to 32m, of the power converter 12, are connected in series.

On the other hand, the n AC/DC converters 311 to 31n and the m AC/DC converters 321 to 32m have DC terminals, and each of the AC/DC converters is connected to the switching circuit 13. Specifically, the AC/DC converter 311 is connected to the changeover switch 411 and the changeover switch 431. The AC/DC converter 31n is connected to the changeover switch 41n and the changeover switch 43n. The AC/DC converter 321 is connected to the changeover switch 421 and the changeover switch 441. The AC/DC converter 32m is connected to the changeover switch 42m and the changeover switch 44m.

In the switching circuit 13, there are DC buses 6a and 6b.

The DC bus 6a can be connected to the AC/DC converters 311 to 31n through the changeover switches 411 to 41n. The DC bus 6b can be connected to the AC/DC converters 311 to 31n through the changeover switches 431 to 43n.

The DC bus 6a can be connected to the AC/DC converters 321 to 32m through the changeover switches 421 to 42m. The DC bus 6b can be connected to the AC/DC converters 321 to 32m through the changeover switches 441 to 44m.

In addition, an inter-bus connection switch 9 is connected between the negative electrode of the DC bus 6a and the positive electrode of the DC bus 6b.

The DC bus 6a is connected to the charging terminal 7a through the switch 51. Similarly, the DC bus 6b is connected to the charging terminal 7b through the switch 52. On the other hand, a positive electrode of the DC bus 6a and a negative electrode of the DC bus 6b are connected to the large-capacity charging terminal 24 through the switch 50. The electric vehicles 8a and 8b are configured to be able to be charged by the charging terminals 7a and 7b. On the other hand, the large-capacity electric vehicle 23 is configured to be able to be charged by the large-capacity charging terminal 24. Accordingly, since the AC/DC converter for charging at a relatively low voltage and the AC/DC converter for charging at a relatively high voltage can be shared, the manufacturing cost of the power conversion device can be reduced and the installation space can be reduced.

The power converter 12 and the central control circuit 11 are connected by an optical cable 14. Accordingly, the central control circuit 11 controls the power converter 12.

Figure 2:
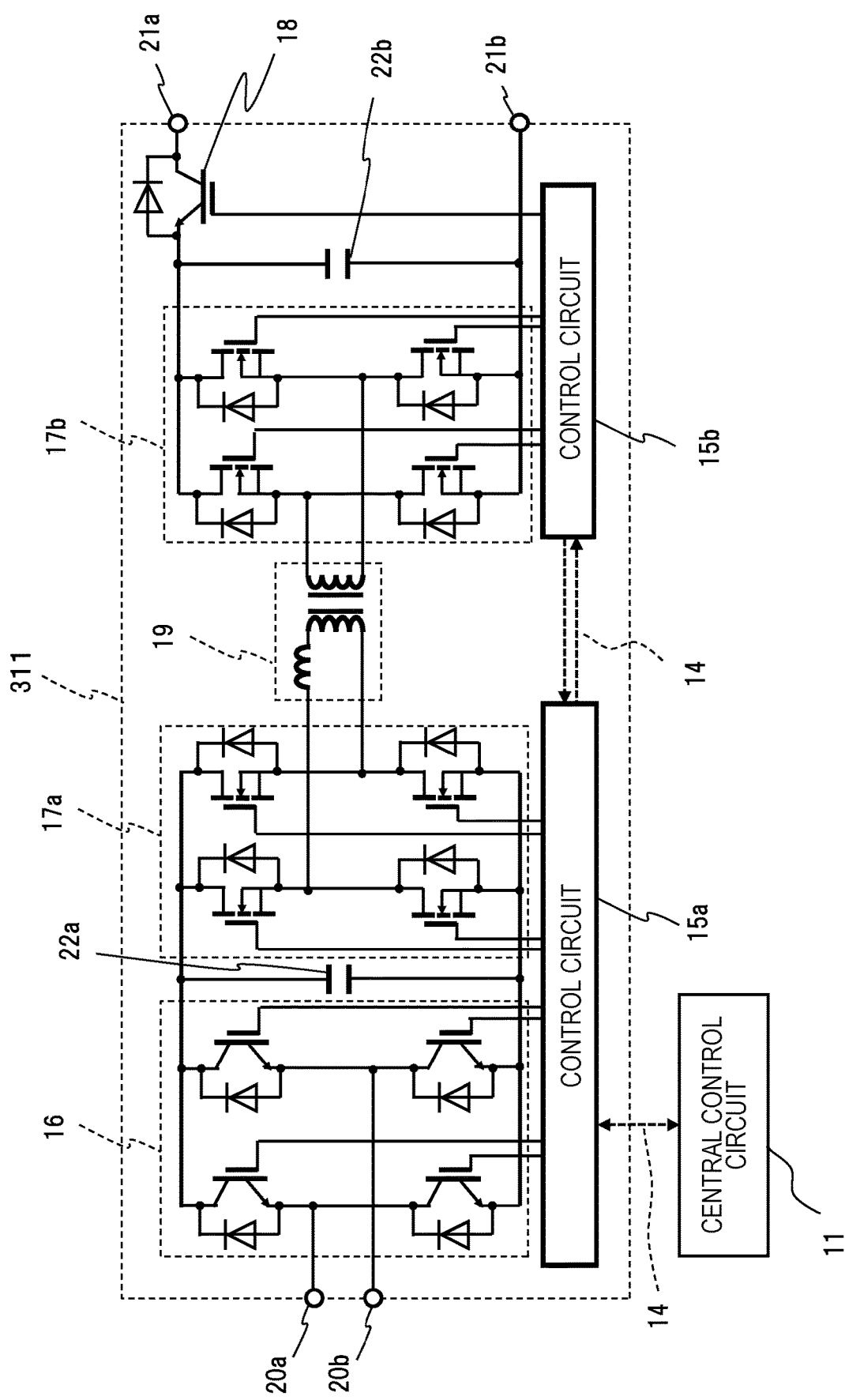
FIG. 2 is a circuit diagram of an AC/DC converter corresponding to a main part of the power conversion device.

FIG. 2 is a circuit diagram of the AC/DC converter 311 corresponding to a main part of the power converter 12. It should be noted that other AC/DC converters are also similarly configured.

The AC/DC converter 311 includes AC terminals 20a and 20b, an insulated gate bipolar transistor (IGBT) bridge 16, smoothing capacitors 22a and 22b, silicon carbide-metal-oxide-semiconductor field-effect transistor (SiC-MOSFET) bridges 17a and 17b, a high-frequency transformer 19, an IGBT 18, DC terminals 21a and 21b, and control circuits 15a and 15b. The circuit formed by the SiC-MOSFET bridges 17a and 17b and the high-frequency transformer 19 has a dual active bridge (DAB) configuration.

The IGBT bridge 16 includes four IGBT elements connected in an H-bridge shape and diodes connected in anti-parallel with the IGBT elements. Each of the SiC-MOSFET bridges 17a and 17b includes four SiC-MOSFET elements connected in an H-bridge shape, and diodes connected in anti-parallel with the SiC-MOSFET elements.

In FIG. 2, each of the AC terminals 20a and 20b is connected to a midpoint of upper and lower arms of a corresponding one of the two legs of the IGBT bridge 16. A smoothing capacitor 22a is connected to a positive electrode and a negative electrode of the IGBT bridge 16. A positive electrode and a negative electrode of the SiC-MOSFET bridge 17a are connected to the smoothing capacitor 22a. The primary side winding wires of the high-frequency transformer 19 are connected to the respective midpoints of the upper and lower arms of the two legs of the SiC-MOSFET bridge 17a. The high-frequency transformer 19 has a leakage inductance therein. Here, the high frequency is, for example, a frequency of 100 Hz or higher, but it is preferable to adopt a frequency of 1 kHz or higher, and it is more preferable to adopt a frequency of 10 kHz or higher.

The secondary winding wires of the high-frequency transformer 19 are connected to the respective midpoints of the upper and lower arms of the two legs of the SiC-MOSFET bridge 17b. The smoothing capacitor 22b is connected between the positive electrode and the negative electrode of the SiC-MOSFET bridge 17b. The IGBT 18 is connected between the positive electrode of the smoothing capacitor 22b and the DC terminal 21a. In addition, the DC terminal 21b is connected to the negative electrode of the smoothing capacitor 22b. The control terminals of the IGBT bridge 16 and the SiC-MOSFET bridge 17a are connected to the control circuit 15a. The control terminals of the SiC-MOSFET bridge 17b and the IGBT 18 are connected to the control circuit 15b.

The AC/DC converter 311 is a bidirectional AC/DC converter. The AC/DC converter 311 can supply the power of the AC power supply 1 to the load, and can supply the power discharged from the load side to the AC power supply 1.

Figure 3:
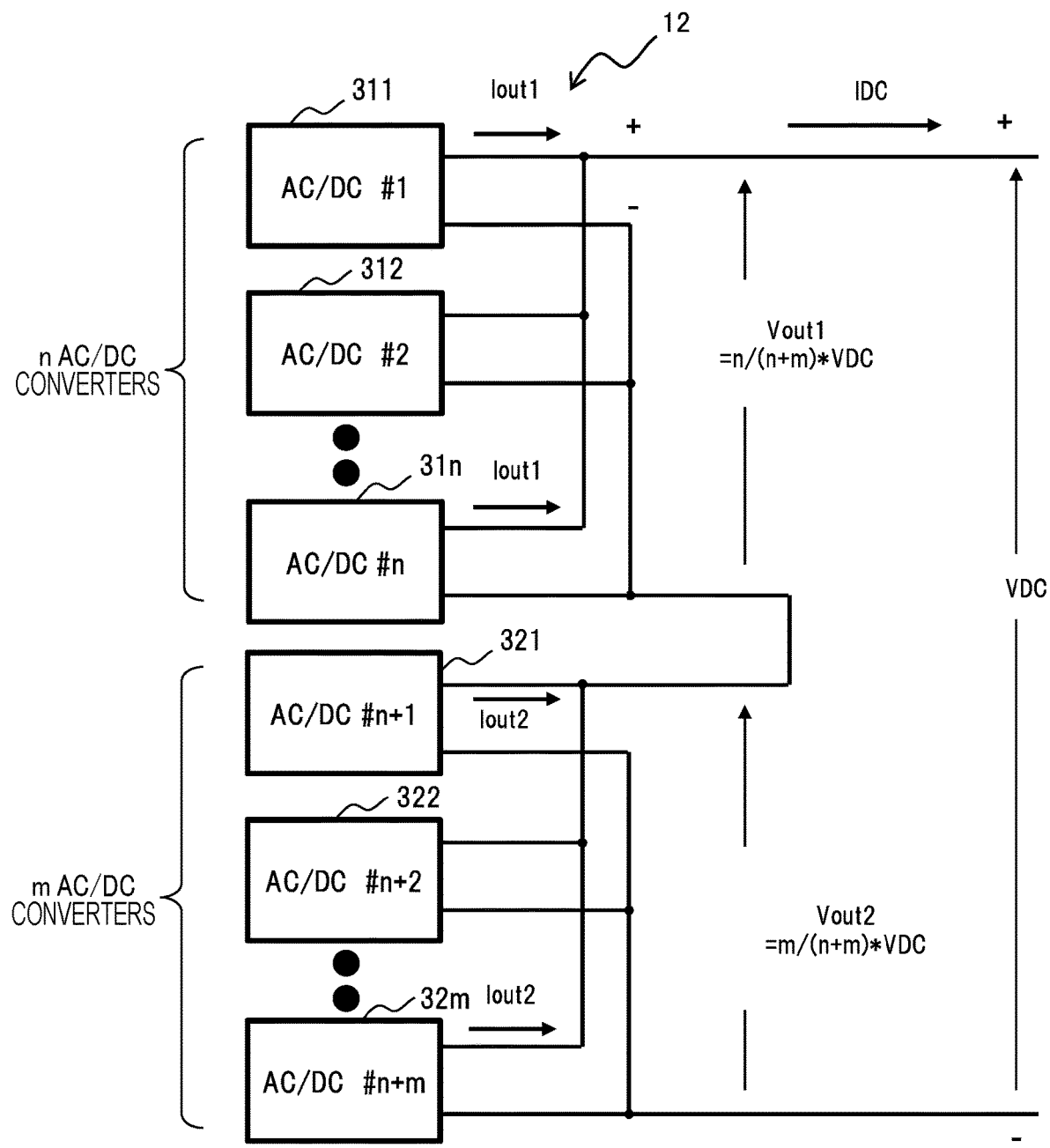
FIG. 3 is a schematic diagram showing a voltage of each unit of a power converter.

FIG. 3 is a schematic diagram showing a voltage of each unit of the power converter 12 according to the present embodiment. FIG. 3 illustrates a connection configuration of n AC/DC converters 311 to 31n and m AC/DC converters 321 to 32m inside the power converter 12 in FIG. 1 and respective DC voltages.

Operation of First Embodiment

Next, the operation of the present embodiment will be described.

The power converter 12 in FIG. 1 has a configuration in which the AC sides of n AC/DC converters 311 to 31n and m AC/DC converters 321 to 32m are connected in series, and is connected to the AC power supply 1 through the reactor 2a. As shown in FIG. 2, the AC side of the AC/DC converter is an IGBT bridge 16, and n+m IGBT bridges 16 are connected in series. Then, each IGBT bridge 16 performs pulse width modulation (PWM) operation while being synchronized, and each IGBT bridge 16 equally shares and rectifies the AC voltage of the AC power supply 1, and causes the smoothing capacitor 22a to generate a DC voltage.

The SiC-MOSFET bridge 17a performs switching operation using the smoothing capacitor 22a as a DC power supply. The SiC-MOSFET bridge 17a and the SiC-MOSFET bridge 17b control the current flowing through the high-frequency transformer 19 by shifting the respective on-off phases while synchronizing. Accordingly, a DC voltage isolated from the AC power supply 1 is generated in the smoothing capacitor 22b connected between the positive electrode and the negative electrode of the SiC-MOSFET bridge 17b. The control circuit 15a performs switching control on the IGBT bridge 16 and the SiC-MOSFET bridge 17a. On the other hand, the control circuit 15b performs switching control on the SiC-MOSFET bridge 17b. The central control circuit 11 transmits a control signal to the control circuits 15a and 15b through the optical cable 14. The control circuit 15a and the control circuit 15b are synchronously controlled by the optical cable 14. In this way, each AC/DC converter can receive power from the AC power supply 1 and output isolated DC power.

Each AC/DC converter can be connected to any one of the DC bus 6a and the DC bus 6b by switching on/off of the changeover switch. For example, in FIG. 1, by turning on the changeover switches 411 to 41n, connecting the n AC/DC converters 311 to 31n to the DC bus 6a, and turning on the switch 51 between the DC bus 6a and the charging terminal 7a, the electric vehicle 8a connected to the charging terminal 7a can be charged.

Similarly, as shown in FIG. 1, by turning on the changeover switches 441 to 44m, connecting the m AC/DC converters 321 to 32m to the DC bus 6b, and turning on the switch 52 between the DC bus 6b and the charging terminal 7b, the electric vehicle 8b connected to the charging terminal 7b can be charged.

In addition, as shown in FIG. 1, by connecting the n AC/DC converters 311 to 31n to the DC bus 6a and connecting the remaining m AC/DC converters 321 to 32m to the DC bus 6b, it is also possible to simultaneously charge the electric vehicle 8a and the electric vehicle 8b.

It should be noted that when the electric vehicles 8a and 8b are charged using the charging terminals 7a and 7b, the inter-bus connection switch 9 is in the off state.

At this time, it should be noted that it is necessary to equalize the power borne by the n AC/DC converters 311 to 31n and the m AC/DC converters 321 to 32m. The AC sides of the n AC/DC converters 311 to 31n and the m AC/DC converters 321 to 32m are connected in series as described above. Therefore, among these, a light load tends to increase the DC voltage of the smoothing capacitor 22a. Among these, a heavy load tends to decrease the DC voltage of the smoothing capacitor 22a. When the difference in the DC voltage of the smoothing capacitor 22a becomes significant, the withstand voltage of the smoothing capacitor 22a, the IGBT bridge 16, or the SiC-MOSFET bridge 17a may be exceeded. Therefore, after grasping the charging power required by the electric vehicles 8a and 8b as loads, the number of allocations to the electric vehicles 8a and 8b is determined so that the output power of the n AC/DC converters 311 to 31n is substantially equal to the output power of the m AC/DC converters 321 to 32m.

Hereinafter, a method for charging the large-capacity electric vehicle 23 in the configuration in FIG. 1 will be described. The large-capacity electric vehicle 23 is an electric vehicle that requires a higher charging voltage and a charging current with larger-capacity than those of the electric vehicles 8a and 8b.

At this time, the state of each of the changeover switches 411 to 41n, the changeover switches 431 to 43n, the changeover switches 421 to 42m, the changeover switches 441 to 44m, the switches 50 to 52, and the inter-bus connection switch 9 is indicated by a color of hatching. Dark hatching is in the on state and pale hatching is in the off state. That is, regarding the n AC/DC converters 311 to 31n, the changeover switches 411 to 41n to be connected to the DC bus 6a are in the on state, and the changeover switches 431 to 43n to be connected to the DC bus 6b are in the off state. Therefore, all the DC output sides of the n AC/DC converters 311 to 31n are connected in parallel to the DC bus 6a.

On the other hand, regarding the m AC/DC converters 321 to 32m, the changeover switches 421 to 42m to be connected to the DC bus 6a are in the off state, and the changeover switches 441 to 44m to be connected to the DC bus 6b are in the on state. Therefore, all the DC output sides of the m AC/DC converters 321 to 32m are connected in parallel and connected to the DC bus 6b.

Furthermore, since the inter-bus connection switch 9 is in the on state, the negative potential side of the DC bus 6a and the positive potential side of the DC bus 6b are connected.

As a result, a voltage obtained by adding the voltage of the DC bus 6a and the voltage of the DC bus 6b is applied to the large-capacity charging terminal 24. FIG. 3 shows the connection state at this time. That is, the n AC/DC converters 311 to 31n are connected to the DC bus 6a, and the output voltage of each of the AC/DC converters 311 to 31n is Vout1. On the other hand, the m AC/DC converters 321 to 32m are connected to the DC bus 6b, and the output voltage of each of the AC/DC converters 321 to 32m is Vout2.

At this time, when the voltage applied to the large-capacity charging terminal 24 is VDC, the voltage is derived by the following Formula (1).

[Math. 1]
$$V_{out1} + V_{out2} = VDC \tag{1}$$

In addition, assuming that the output current is IDC, the DC power Pout output to the large-capacity charging terminal 24 is derived by the following Formula (2).

[Math. 2]
$$P_{out} = IDC \times VDC \tag{2}$$

As described above, in order to equalize the voltage sharing on the AC side, it is necessary to perform control so that the shared power of the n AC/DC converters 311 to 31n and the shared power of the m AC/DC converters 321 to 32m are equal. Therefore, the output power P1 of the n AC/DC converters 311 to 31n is derived by Formula (3) since the n AC/DC converters equally share the current IDC.

[Math. 3]
$$P_1 = (1/n) \times IDC \times V_{out1} \tag{3}$$

Similarly, the output power P2 of the m AC/DC converters 321 to 32m is derived by Formula (4) since the m converters equally share the current IDC.

[Math. 4]
$$P_2 = (1/m) \times IDC \times V_{out2} \tag{4}$$

Furthermore, in order to equalize the voltage sharing on the AC side, it is necessary to satisfy Formula (5).

[Math. 5]
$$P_1 = P_2 \tag{5}$$

Therefore, the relationship shown in Formula (6) is derived.

[Math. 6]
$$(1/n) \times IDC \times V_{out1} = (1/m) \times IDC \times V_{out2} \tag{6}$$

Formula (7) is obtained by simplifying this.

[Math. 7]
$$(1/n) \times V_{out1} = (1/m) \times V_{out2} \tag{7}$$

The relationship of Formula (8) is derived from Formula (7).

[Math. 8]
$$V_{out1} : V_{out2} = n : m \tag{8}$$

Formula (9) and Formula (10) are derived from Formula (8) and Formula (1).

[Math. 9]
$$V_{out1} = [n/(n+m)] \times VDC \tag{9}$$

[Math. 10]
$$V_{out2} = [m/(n+m)] \times VDC \tag{10}$$

Therefore, the n AC/DC converters 311 to 31n set the output voltage to [n/(n+m)]×VDC, and the m AC/DC converters 321 to 32m set the output voltage to [m/(n+m)]×VDC, thereby making it possible to equalize the input/output power of all the AC/DC converters. The central control circuit 11 controls the output voltage of the n AC/DC converters 311 to 31n to be [n/(n+m)]×VDC, and controls the output voltage of the m AC/DC converters 321 to 32m to be [m/(n+m)]×VDC.

Figure 4:
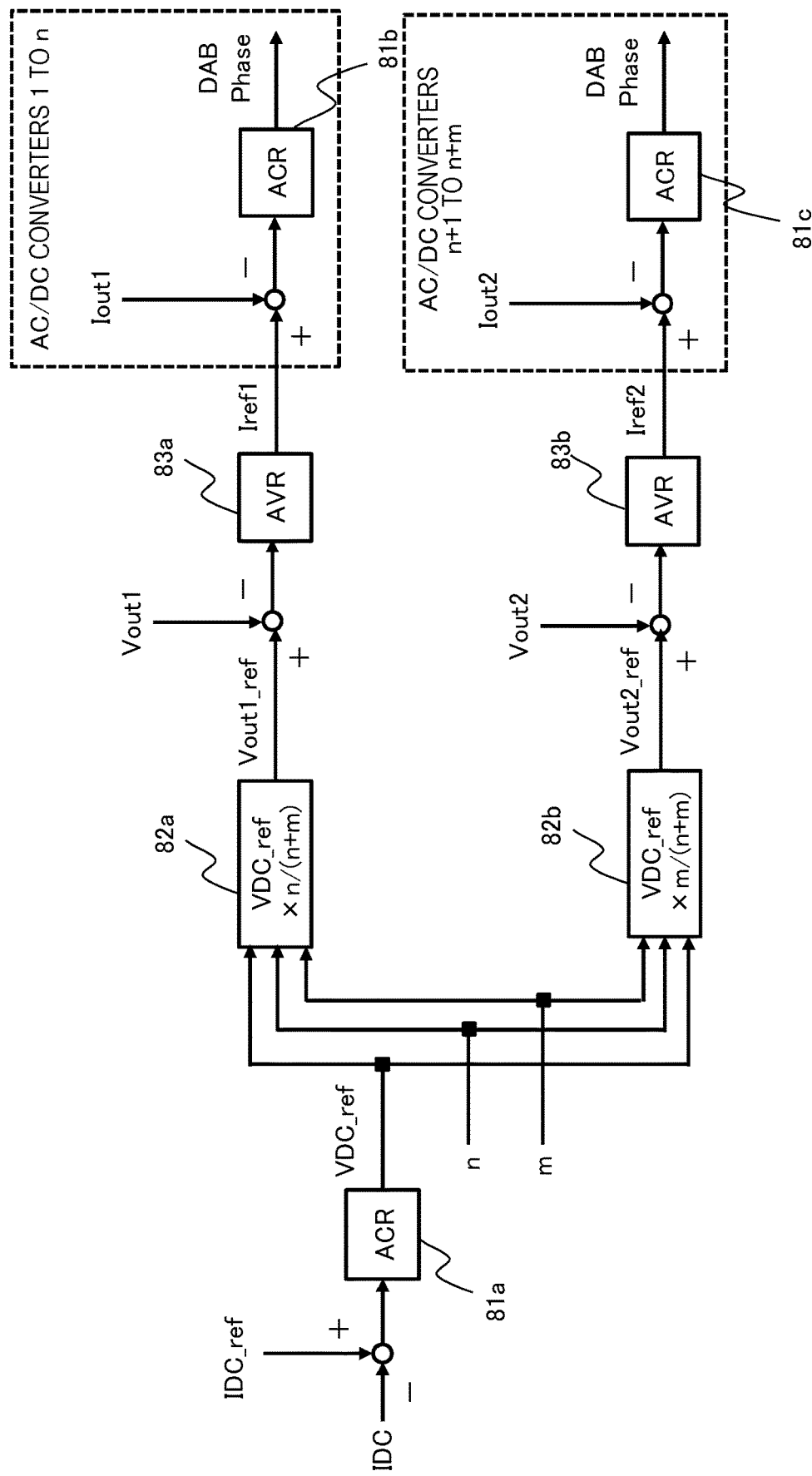
FIG. 4 is a diagram showing a control block of the power converter.

FIG. 4 shows control blocks of n AC/DC converters 311 to 31n and m AC/DC converters 321 to 32m of the power converter 12.

A current command value IDC_ref is required from the large-capacity electric vehicle 23 to the large-capacity charging terminal 24. In contrast to this, IDC is an output current from the entire converters shown in FIG. 3. In the block diagram in FIG. 4, these current values are compared to obtain a difference, and the difference is input to the ACR control block 81a. The ACR control block 81a performs proportional integral calculation on the current difference by PI control. The output of the ACR control block 81a is VDC_ref, which corresponds to the command value of the voltage VDC of the converters as a whole shown in FIG. 3. Next, the ACR control block 81a performs the calculations of Formulas (9) and (10) with the multiplication blocks 82a and 82b using the number of converters n and m and VDC_ref, respectively. As a result, Vout1_ref and Vout2_ref are respectively output.

In the AC/DC converters 311 to 31n operated in parallel, the output voltage Vout1 is measured and compared with Vout1_ref. Similarly, in the AC/DC converters 321 to 32m operated in parallel, the output voltage Vout2 is measured and compared with Vout2_ref.

These comparison results are input to the AVR control blocks 83a and 83b, respectively. The AVR control blocks 83a and 83b perform proportional integral calculation on the voltage error by PI control, and output Iref1 and Iref2, respectively.

That is, the central control circuit 11 functions as a control unit that connects the DC buses 6a and 6b in series by the inter-bus connection switch 9, allocates and connects n AC/DC converters 311 to 31n to the DC bus 6a, allocates and connects m AC/DC converters 321 to 32m to the DC bus 6b, and controls the AC/DC converter 311 to 31n and the AC/DC converter 321 to 32m so that the voltage ratio of the DC buses 6a and 6b is n:m. The central control circuit 11 further turns on (closes) the switch 50 to connect the DC buses 6a and 6b connected in series by the inter-bus connection switch 9 to the large-capacity charging terminal 24. Accordingly, the DC buses 6a and 6b connected in series can be connected to the large-capacity electric vehicle 23.

In the AC/DC converters 311 to 31n, the following calculation is performed in each converter. That is, the AC/DC converters 311 to 31n detect the output current Iout1, inputs the current error compared with Iref1 to the ACR control block 81b, and output the phase of the DAB that is the control command value of each converter. Similarly, in the AC/DC converters 321 to 32m, the following calculation is performed in each converter. That is, the AC/DC converters 321 to 32m detect the output current Iout2, inputs the current error compared with Iref2 to the ACR control block 81c, and output the phase of the DAB that is the control command value of each converter.

As a result of this control, the input/output power of the AC/DC converter is equalized, the voltage sharing on the AC side of each AC/DC converter is balanced, and the large-capacity electric vehicle 23 can be stably charged.

As a result, it is possible to achieve sharing of the power conversion device 100 for charging the large-capacity electric vehicle 23 and charging the conventional electric vehicles 8a and 8b. Therefore, the manufacturing cost of the power conversion device 100 can be reduced, and the installation space can be reduced.

It should be noted that at this time, the switches 51 and 52 to be connected to the charging terminals 7a and 7b are in the off state, and charging from the charging terminals 7a and 7b to the electric vehicles 8a and 8b is stopped.

According to the present embodiment, even when, among the two divided groups, the parallel number of one group of AC/DC converters 311 to 31n is different from the parallel number of the other group of AC/DC converters 321 to 32m, the input/output power of each AC/DC converter can be equalized, and the shared voltage on the AC side can be equalized.

It should be noted that since the AC/DC converters 311 to 31n and the AC/DC converters 321 to 32m in the present embodiment are configured by the circuit shown in FIG. 2, bidirectional operation is possible by turning on the IGBT 18 and controlling the phase of the DAB circuit. Therefore, it is also possible to cope with discharge from the electric vehicles 8a and 8b and the large-capacity electric vehicle 23, and it is also suitable for use as a system by performing discharge from the electric vehicle side to the AC power supply 1 side, in other words, suitable for vehicle to grid (V2G).

Second Embodiment

Next, a second embodiment of the present invention will be described with reference to FIGS. 5, 3, and 4.

Configuration of Second Embodiment

Figure 5:
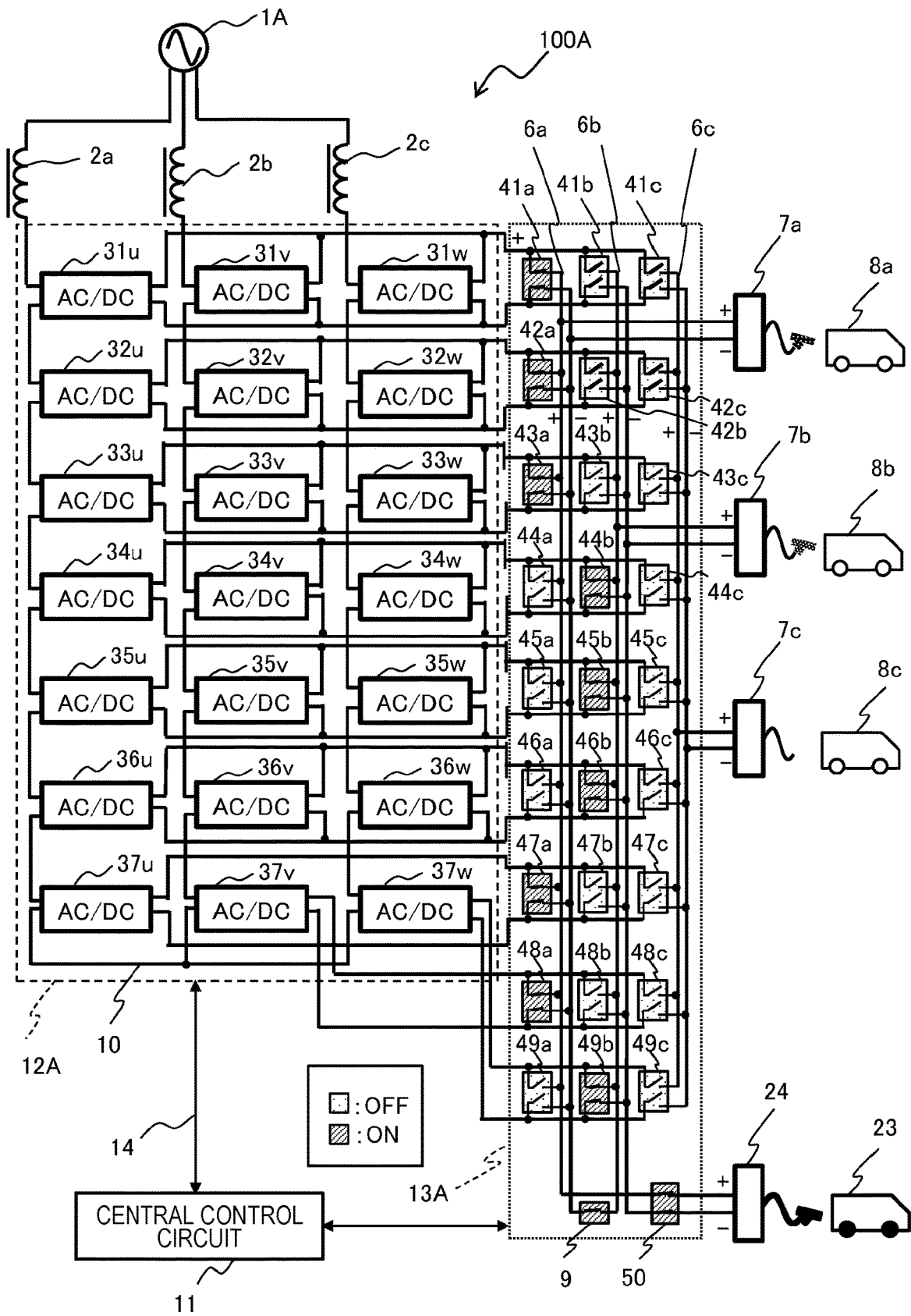
FIG. 5 is a configuration diagram of a power conversion device according to a second embodiment.

FIG. 5 is a configuration diagram of a power conversion device 100A according to the second embodiment.

In FIG. 5, in the following description, portions corresponding to the respective portions of the above-described other embodiment are denoted by the same reference numerals, and the description thereof may be omitted.

In FIG. 5, the power conversion device 100A is connected to a three-phase AC power supply 1A, charging terminals 7a to 7c, and a large-capacity charging terminal 24, and includes reactors 2a to 2c, a power converter 12A, a switching circuit 13A, a central control circuit 11, and an optical cable 14. The power conversion device 100A causes the charging terminals 7a to 7c to charge the electric vehicles 8a to 8c, and causes the large-capacity charging terminal 24 to charge the large-capacity electric vehicle 23.

The reactors 2a to 2c are provided on lines connecting the power converter 12A to each phase of the three-phase AC power supply 1A, and block a high-frequency current generated accompanying switching of the power converter 12A from flowing between the three-phase AC power supply 1A and the power converter 12A.

The power converter 12A includes seven AC/DC converters 31u to 37u, seven AC/DC converters 31v to 37v, and seven AC/DC converters 31w to 37w. The neutral point 10 is a neutral point of the AC/DC converters 37u, 37v, and 37w. The power converter 12A can convert the AC power of the three-phase AC power supply 1A into DC power, and can also perform a reverse conversion. The AC/DC converters 31u to 37u, the AC/DC converters 31v to 37v, and the AC/DC converters 31w to 37w are isolated cell converters in which the same number of AC/DC converters are connected in series to the respective phases of the three-phase AC power supply 1A through reactors.

The switching circuit 13A includes changeover switches 41a to 49a, changeover switches 41b to 49b, changeover switches 41c to 49c, a switch 50, DC buses 6a to 6c, and an inter-bus connection switch 9. The switching circuit 13A switches the DC power of the power converter 12A described above to a desired voltage and supplies the voltage to the outside, and is connected to the charging terminals 7a to 7c and the large-capacity charging terminal 24.

The charging terminals 7a to 7c are terminals for charging the electric vehicles 8a to 8c. The large-capacity charging terminal 24 is a terminal for charging the large-capacity electric vehicle 23. It should be noted that switches (not shown) are connected between each of the charging terminals 7a to 7c and the DC buses 6a to 6c. The switches not shown function as second load connection means for connecting the DC buses 6a to 6c to loads, respectively.

The DC buses 6a to 6c are DC paths provided on the output side of the power conversion device 100A, and are integrally positive and negative lines independent of each other. The changeover switches 41a to 49a, the changeover switches 41b to 49b, and the changeover switches 41c to 49c are DC path connection means that selectively connect the AC/DC converters 31u to 37u, the AC/DC converters 31v to 37v, and the AC/DC converters 31w to 37w to the DC buses 6a to 6c.

The inter-bus connection switch 9 is a series connection means that connects the DC buses 6a and 6b in series.

The switches 50 to 52 are first load connection means that connect the electrical paths connected in series by the inter-bus connection switch 9 to the large-capacity electric vehicle 23 as a load. The changeover switches 41a to 49a, the changeover switches 41b to 49b, the changeover switches 41c to 49c, the switches 50 to 52, and the inter-bus connection switch 9 are electromagnetic switches controlled by the central control circuit 11, but may be switches manually operated by an operator. The inter-bus connection switch 9 is a switch that conducts one negative electrode and the other positive electrode of the DC buses 6a and 6b.

The second embodiment is different from the first embodiment (FIG. 1) in that the three-phase AC power supply 1A of the second embodiment assumes a three-phase AC and a high voltage AC such as 3.3 kV and 6.6 kV. Accordingly, reactors 2a, 2b, and 2c are provided for respective phases. In addition, regarding the power converter 12A, seven AC/DC converters 31u to 37u are connected in series to the U phase, the AC/DC converter 31u is connected to the reactor 2a, and the AC/DC converter 37u is connected to the neutral point 10. In addition, in the power converter 12A, seven AC/DC converters 31v to 37v are connected in series to the V phase, the AC/DC converter 31v is connected to the reactor 2b, and the AC/DC converter 37v is connected to the neutral point 10. Similarly, in the power converter 12A, seven AC/DC converters 31w to 37w are connected in series to the W phase, the AC/DC converter 31w is connected to the reactor 2c, and the AC/DC converter 37w is connected to the neutral point 10. As a result, the power converter 12A includes a total of 21 AC/DC converters.

DC side outputs of the AC/DC converters 31u, 31v, and 31w are connected in parallel, connected to the DC bus 6a through the changeover switch 41a, connected to the DC bus 6b through the changeover switch 41b, and connected to the DC bus 6c through the changeover switch 41c.

DC side outputs of the AC/DC converters 32u, 32v, and 32w are connected in parallel, connected to the DC bus 6a through the changeover switch 42a, connected to the DC bus 6b through the changeover switch 42b, and connected to the DC bus 6c through the changeover switch 42c.

DC side outputs of the AC/DC converters 33u, 33v, and 33w are connected in parallel, connected to the DC bus 6a through the changeover switch 43a, connected to the DC bus 6b through the changeover switch 43b, and connected to the DC bus 6c through the changeover switch 43c.

DC side outputs of the AC/DC converters 34u, 34v, and 34w are connected in parallel, connected to the DC bus 6a through the changeover switch 44a, connected to the DC bus 6b through the changeover switch 44b, and connected to the DC bus 6c through the changeover switch 44c.

DC side outputs of the AC/DC converters 35u, 35v, and 35w are connected in parallel, connected to the DC bus 6a through the changeover switch 45a, connected to the DC bus 6b through the changeover switch 45b, and connected to the DC bus 6c through the changeover switch 45c.

DC side outputs of the AC/DC converters 36u, 36v, and 36w are connected in parallel, connected to the DC bus 6a through the changeover switch 46a, connected to the DC bus 6b through the changeover switch 46b, and connected to the DC bus 6c through the changeover switch 46c.

The DC side output of the AC/DC converter 37u is connected to the DC bus 6a through the changeover switch 47a, connected to the DC bus 6b through the changeover switch 47b, and connected to the DC bus 6c through the changeover switch 47c.

The DC side output of the AC/DC converter 37v is connected to the DC bus 6a through the changeover switch 48a, connected to the DC bus 6b through the changeover switch 48b, and connected to the DC bus 6c through the changeover switch 48c.

The DC side output of the AC/DC converter 37w is connected to the DC bus 6a through the changeover switch 49a, connected to the DC bus 6b through the changeover switch 49b, and connected to the DC bus 6c through the changeover switch 49c.

The charging terminals 7a, 7b, and 7c are connected to the DC buses 6a, 6b, and 6c, respectively. On the other hand, the large-capacity charging terminal 24 is connected to the DC buses 6a and 6b through the switch 50.

Operation of Second Embodiment

Next, the operation of the second embodiment will be described. The seven AC/DC converters 31u to 37u, the seven AC/DC converters 31v to 37v, and the seven AC/DC converters 31w to 37w in the second embodiment can receive power from the three-phase AC power supply 1A and output DC power isolated from each other.

In FIG. 5, the AC/DC converter can be connected to any of the DC buses 6a to 6c by switching on/off of a changeover switch connected to itself. For example, by connecting seven AC/DC converters 31u, 31v, 31w, 32u, 32v, 32w, and 37u to the DC bus 6a, the electric vehicle 8a connected to the charging terminal 7a can be charged. In addition, at this time, by simultaneously connecting seven AC/DC converters 33u, 33v, 33w, 34u, 34v, 34w, and 37v to the DC bus 6b, the electric vehicle 8b connected to the charging terminal 7b can be charged. In addition, at this time, by simultaneously connecting seven AC/DC converters 35u, 35v, 35w, 36u, 36v, 36w, and 37w to the DC bus 6c, the electric vehicle 8c connected to the charging terminal 7c can be charged.

It should be noted that when the electric vehicles 8a and 8b are charged using the charging terminals 7a and 7b, the inter-bus connection switch 9 is in the off state.

Also in the present embodiment, similarly to the above-described embodiment, it is necessary to equalize the power borne by the AC/DC converters 31u to 37u, the AC/DC converters 31v to 37v, and the AC/DC converters 31w to 37w. However, in the above example, since seven AC/DC converters are allocated to each of the electric vehicles 8a, 8b, and 8c, when the amounts of charging power of the electric vehicles 8a, 8b, and 8c are equal, the amounts of shared power of the respective AC/DC converters are equal.

When there is a large difference in the amounts of charging power of the electric vehicles 8a, 8b, and 8c, the amounts of charging power required by the electric vehicles 8a, 8b, and 8c are grasped, and then the number of AC/DC converters allocated to the electric vehicles 8a, 8b, and 8c is determined so that the amounts of output power of the AC/DC converters are substantially equal.

Hereinafter, a method for charging the large-capacity electric vehicle 23 in the configuration of the second embodiment will be described. When the large-capacity electric vehicle 23 is charged, the states of the changeover switches 41a to 49a, the changeover switches 41b to 49b, the changeover switches 41c to 49c, the switch 50, and the inter-bus connection switch 9 are displayed in the color of hatching, the dark hatching is in the on state, and the pale hatching is in the off state. That is, the changeover switches 41a, 42a, 43a, 47a, and 48a are in the on state. At this time, 11 AC/DC converters 31u, 31v, 31w, 32u, 32v, 32w, 33u, 33v, 33w, 37u, and 37v are connected to the DC bus 6a. On the other hand, since the changeover switches 41b, 41c, 42b, 42c, 43b, 43c, 47b, 47c, 48b, and 48c connected to the DC buses 6b and 6c are in the off state, all the DC output sides of the 11 AC/DC converters 31u, 31v, 31w, 32u, 32v, 32w, 33u, 33v, 33w, 37u, and 37v are connected in parallel and are connected to the DC bus 6a.

On the other hand, regarding the remaining 10 AC/DC converters 34u, 34v, 34w, 35u, 35v, 35w, 36u, 36v, 36w, and 37w, the changeover switches 44b, 45b, 46b, and 49b connected to the DC bus 6b are in the on state. The changeover switches 44a, 44c, 45a, 45c, 46a, 46c, and 49b connected to the DC buses 6a and 6c are in the off state. Therefore, the DC output sides of the 10 AC/DC converters 34u, 34v, 34w, 35u, 35v, 35w, 36u, 36v, 36w, and 37w are all connected in parallel and connected to the DC bus 6b.

Furthermore, at this time, the inter-bus connection switch 9 is in the on state, the negative potential side of the DC bus 6a and the positive potential side of the DC bus 6b are connected. As a result, a voltage obtained by adding the voltage of the DC bus 6a and the voltage of the DC bus 6b is applied to the large-capacity charging terminal 24.

At this time, the output voltage and current of each AC/DC converter are as shown in FIG. 3. That is, in FIG. 3, n=11 and m=10, and the output voltage Vout1 of the AC/DC converters 31u, 31v, 31w, 32u, 32v, 32w, 33u, 33v, 33w, 37u, and 37v is derived from the following Formula (11).

[Math. 11]
$$V_{out1} = [11/21] \times VDC \quad (11)$$

The output voltage Vout2 of the remaining AC/DC converters 34u, 34v, 34w, 35u, 35v, 35w, 36u, 36v, 36w, and 37w is derived from the following Formula (12).

[Math. 12]
$$V_{out2} = [10/21] \times VDC \quad (12)$$

That is, the central control circuit 11 connects the DC buses 6a and 6b in series by the inter-bus connection switch 9, allocates 11 AC/DC converters 31u, 31v, 31w, 32u, 32v, 32w, 33u, 33v, 33w, 37u, and 37v to the DC bus 6a, allocates 10 AC/DC converters 34u, 34v, 34w, 35u, 35v, 35w, 36u, 36v, 36w, and 37w to the DC bus 6b, and performs connection. Then, the central control circuit 11 performs control so that the voltage ratio of the DC buses 6a and 6b becomes n:m. The central control circuit 11 further turns on (closes) the switch 50 to connect the DC buses 6a and 6b connected in series by the inter-bus connection switch 9 to the large-capacity charging terminal 24. Accordingly, the DC buses 6a and 6b connected in series can be connected to the large-capacity electric vehicle 23.

It should be noted that the control of each AC/DC converter can be achieved using the control block of the first embodiment shown in FIG. 4. Accordingly, since the AC/DC converter for charging at a relatively low voltage and the AC/DC converter for charging at a relatively high voltage can be shared, the manufacturing cost of the power conversion device 100A can be reduced and the installation space can be reduced.

In addition, since each AC/DC converter in the present embodiment includes the circuit of the first embodiment shown in FIG. 2, bidirectional operation is possible by setting the IGBT 18 to the on state and controlling the phase of the DAB circuit. Therefore, it is also possible to cope with discharge from the electric vehicles 8a, 8b, and 8c and the large-capacity electric vehicle 23, and it is suitable for use as a system by performing discharge from the electric vehicle side to the AC power supply 1 side, in other words, suitable for V2G.

Third Embodiment

Next, a power converter according to a preferred third embodiment of the present invention will be described with reference to FIGS. 6 and 7.

Configuration of Third Embodiment

Figure 6:
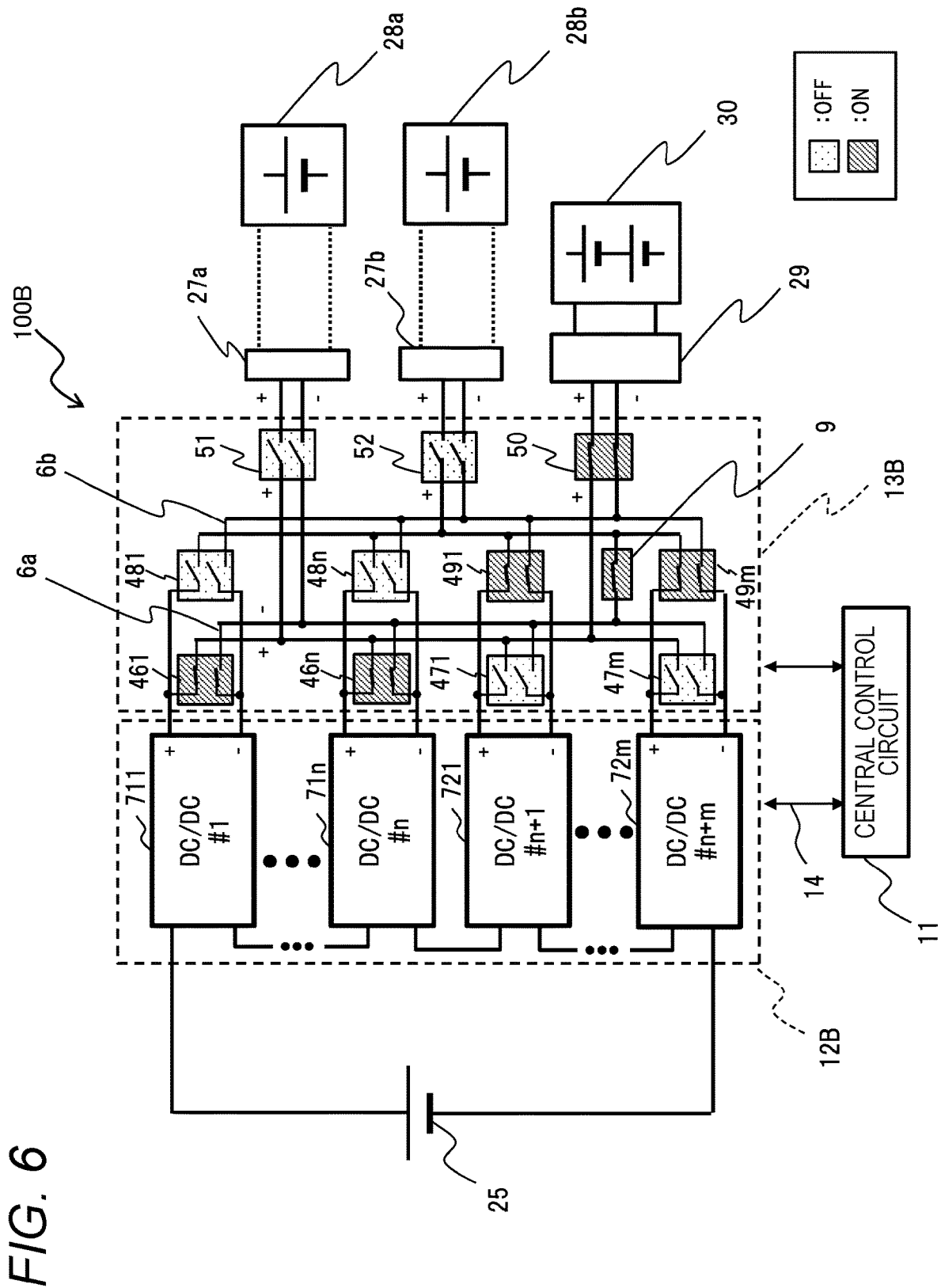
FIG. 6 is a configuration diagram of a power conversion device according to a third embodiment.

FIG. 6 is a configuration diagram of a power conversion device 100B according to the third embodiment. It should be noted that in the following description, portions corresponding to the respective portions of the above-described other embodiment are denoted by the same reference numerals, and the description thereof may be omitted.

In FIG. 6, the power conversion device 100B is connected to a DC power supply 25, connectors 27a and 27b, and a high-voltage connector 29, and includes a power converter 12B, a switching circuit 13B, a central control circuit 11, and an optical cable 14. The power conversion device 100B is connected to the low-voltage batteries 28a and 28b by the connectors 27a and 27b to charge the batteries, and is connected to the high-voltage battery 30 by the high-voltage connector 29 to charge the battery.

The power converter 12B includes n DC/DC converters 711 to 71n and m DC/DC converters 721 to 72m. The n DC/DC converters 711 to 71n and the m DC/DC converters 721 to 72m are isolated cell converters functioning as DC/DC converters. The DC/DC converters 711 to 71n and the DC/DC converter 721 to 72m can supply the power of the DC power supply 25 to the load, and can supply the power discharged from the load side to the DC power supply 25.

The switching circuit 13B includes changeover switches 461 to 46n, changeover switches 481 to 48n, changeover switches 471 to 47m, changeover switches 491 to 49m, switches 50 to 52, DC buses 6a and 6b, and an inter-bus connection switch 9. The switching circuit 13B switches the DC power of the power converter 12B described above to a desired voltage and supplies the voltage to the outside, and is connected to the connectors 27a and 27b and the high-voltage connector 29.

The DC buses 6a and 6b are two or more DC paths provided on the output side. The changeover switches 461 to 46n and the changeover switches 481 to 48n are DC path connection means that selectively connect the n DC/DC converters 711 to 71n to the DC buses 6a and 6b. The changeover switches 471 to 47m and the changeover switches 491 to 49m are DC path connection means that selectively connect the m DC/DC converters 721 to 72m to the DC buses 6a and 6b.

The inter-bus connection switch 9 is a series connection means that connects the DC buses 6a and 6b in series. The switch 50 is a first load connection means that connects the electrical paths connected in series by the inter-bus connection switch 9 to the high-voltage battery 30 as a load. The changeover switches 461 to 46n, the changeover switches 481 to 48n, the changeover switches 471 to 47m, the changeover switches 491 to 49m, the switches 50 to 52, and the inter-bus connection switch 9 are electromagnetic switches controlled by the central control circuit 11, but may be switches manually operated by an operator. The switches 51 and 52 function as second load connection means for connecting the DC buses 6a and 6b to loads, respectively. The inter-bus connection switch 9 is a switch that conducts one negative electrode and the other positive electrode of the DC buses 6a and 6b.

A configuration of the power conversion device 100B in FIG. 6 will be described. In FIG. 6, the DC power supply 25 is connected to the power converter 12B. Inside the power converter 12B, there are n DC/DC converters 711 to 71n and m DC/DC converters 721 to 72m. The terminals on the DC power supply 25 side of the n DC/DC converters 711 to 71n and the m DC/DC converters 721 to 72m are connected in series. On the other hand, the n DC/DC converters 711 to 71n and the m DC/DC converters 721 to 72m include DC terminals isolated from the DC power supply 25, and are each connected to the switching circuit 13B.

Specifically, the DC/DC converter 711 is connected to the changeover switch 461 and the changeover switch 481. The DC/DC converter 71n is connected to the changeover switch 46n and the changeover switch 48n. The DC/DC converter 721 is connected to the changeover switch 471 and the changeover switch 491. The DC/DC converter 72m is connected to the changeover switch 47m and the changeover switch 49m.

In the switching circuit 13B, there are DC buses 6a and 6b.

The DC bus 6a can be connected to the DC/DC converters 711 to 71n through the changeover switches 461 to 46n. The DC bus 6b can be connected to the DC/DC converters 711 to 71n through the changeover switches 481 to 48n.

The DC bus 6a can be connected to the DC/DC converters 721 to 72m through the changeover switches 471 to 47m. The DC bus 6b can be connected to the DC/DC converters 721 to 72m through the changeover switches 491 to 49m.

In addition, an inter-bus connection switch 9 is connected between the negative electrode of the DC bus 6a and the positive electrode of the DC bus 6b.

The DC bus 6a is connected to the connector 27a through the switch 51. Similarly, the DC bus 6b is connected to the connector 27b through the switch 52. On the other hand, a positive electrode of the DC bus 6a and a negative electrode of the DC bus 6b are connected to the high-voltage connector 29 through the switch 50. The low-voltage batteries 28a and 28b are configured to be connectable to the connectors 27a and 27b. On the other hand, the high-voltage battery 30 is configured to be connectable to the high-voltage connector 29.

The power converter 12B and the central control circuit 11 are connected by an optical cable 14.

Figure 7:
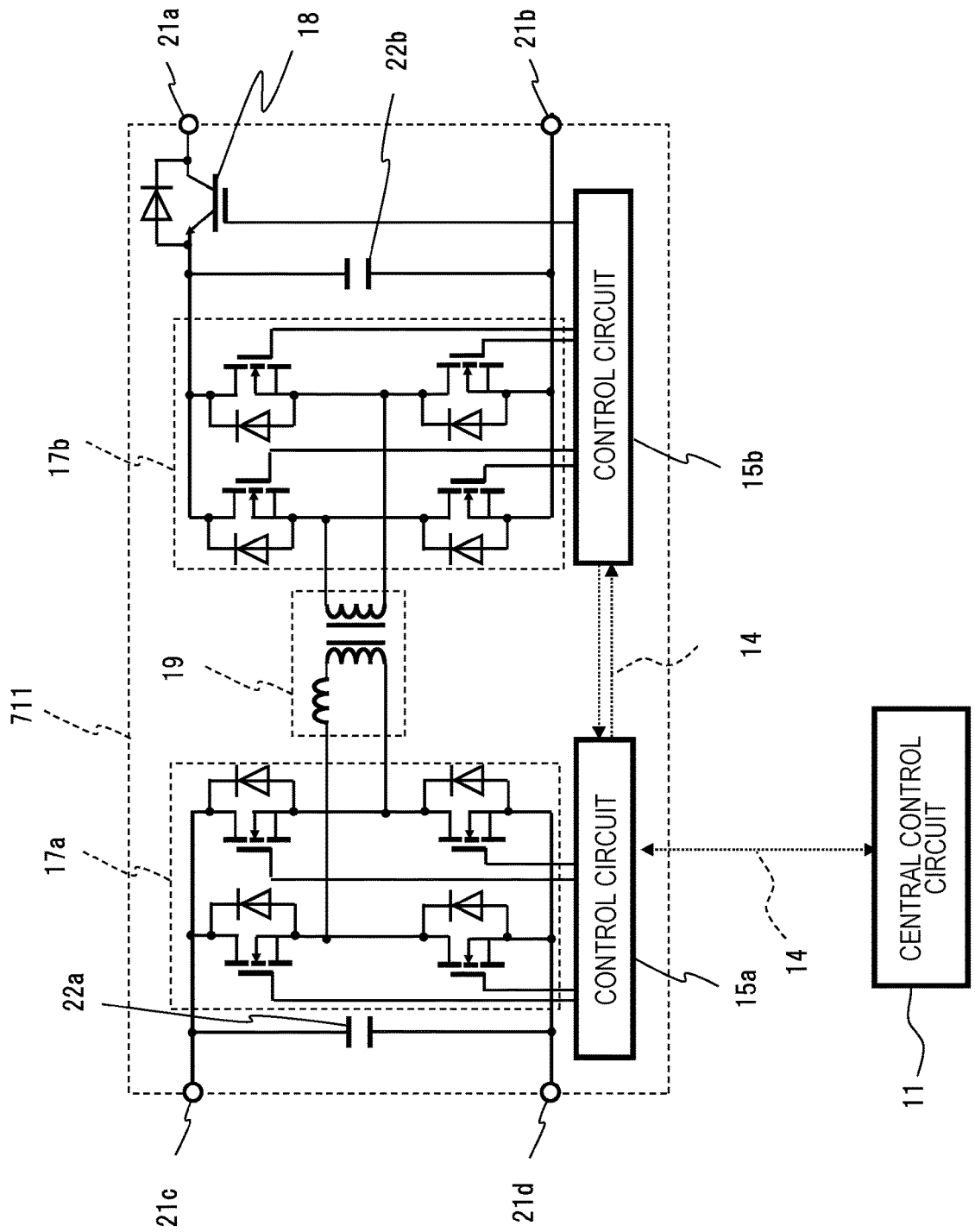
FIG. 7 is a circuit diagram of a main part of the power conversion device.

FIG. 7 is a circuit diagram of a DC/DC converter 711 corresponding to a main part of the power converter 12B of the third embodiment. It should be noted that other DC/DC converters are also similarly configured.

In FIG. 6, the DC/DC converter 711 includes DC terminals 21c and 21d, smoothing capacitors 22a and 22b, SiC-MOSFET bridges 17a and 17b, a high-frequency transformer 19, an IGBT 18, DC terminals 21a and 21b, and control circuits 15a and 15b. In the DC/DC converter 711, the circuit unit formed by the SiC-MOSFET bridges 17a and 17b and the high-frequency transformer 19 has a dual active bridge (DAB) configuration.

Each of the SiC-MOSFET bridges 17a and 17b includes four SiC-MOSFET elements connected in an H-bridge shape, and diodes connected in anti-parallel with the SiC-MOSFET elements.

The DC terminals 21c and 21d are connected to a positive electrode and a negative electrode of the SiC-MOSFET bridge 17a, respectively. In addition, a smoothing capacitor 22a is connected between the positive electrode and the negative electrode of the SiC-MOSFET bridge 17a. The primary side winding wires of the high-frequency transformer 19 are connected to the respective midpoints of the upper and lower arms of the two legs of the SiC-MOSFET bridge 17a. The high-frequency transformer 19 has a leakage inductance therein.

The secondary winding wires of the high-frequency transformer 19 are connected to the respective midpoints of the upper and lower arms of the two legs of the SiC-MOSFET bridge 17b. In the smoothing capacitor 22b, a positive electrode and a negative electrode of the SiC-MOSFET bridge 17b are connected. The IGBT 18 is connected between the positive electrode of the smoothing capacitor 22b and the DC terminal 21a. In addition, the DC terminal 21b is connected to the negative electrode of the smoothing capacitor 22b. The control terminal of the SiC-MOSFET bridge 17a is connected to the control circuit 15a. The control terminals of the SiC-MOSFET bridge 17b and the IGBT 18 are connected to the control circuit 15b.

Operation of Third Embodiment

Next, the operation of the present embodiment will be described.

The power converter 12B in FIG. 6 has a configuration in which n DC/DC converters 711 to 71n and m DC/DC converters 721 to 72m are connected in series, and is connected to the DC power supply 25. Smoothing capacitors 22a are connected to the DC power supply 25 side of the n DC/DC converters 711 to 71n and the m DC/DC converters 721 to 72m, and n+m smoothing capacitors 22a are connected in series.

The SiC-MOSFET bridge 17a performs switching operation using the smoothing capacitor 22a as a DC power supply. The SiC-MOSFET bridge 17a and the SiC-MOSFET bridge 17b control the current flowing through the high-frequency transformer 19 by shifting the respective on-off phases while synchronizing. A DC voltage isolated from the DC power supply 25 is generated in the smoothing capacitor 22b connected between the positive electrode and the negative electrode of the SiC-MOSFET bridge 17b. The switching of the SiC-MOSFET bridge 17a described above is controlled by the control circuit 15a. The switching of the SiC-MOSFET bridge 17b is controlled by the control circuit 15b. The control signals of the control circuits 15a and 15b are transmitted from the central control circuit 11 to the control circuits 15a and 15b through the optical cable 14. The control circuits 15a and 15b are synchronously controlled by the optical cable 14.

In this manner, the n DC/DC converters 711 to 71n and the m DC/DC converters 721 to 72m can receive power from the DC power supply 25 and each output isolated DC power.

In FIG. 6, the DC/DC converters 711 to 71n and the DC/DC converters 721 to 72m can be connected to any one of the DC bus 6a and the DC bus 6b by switching on/off of changeover switches connected to themselves. For example, as shown in FIG. 6, by connecting the n DC/DC converters 711 to 71n to the DC bus 6a, and turning on the switch 51 between the DC bus 6a and the connector 27a, the low-voltage battery 28a connected to the connector 27a can be charged. Similarly, by connecting the m DC/DC converters 721 to 72m to the DC bus 6b, and turning on the switch 52 between the DC bus 6b and the connector 27b, the low-voltage battery 28b connected to the connector 27b can be charged. In addition, by connecting the n DC/DC converters 711 to 71n to the DC bus 6a and connecting the remaining m DC/DC converters 721 to 72m to the DC bus 6b, it is also possible to simultaneously charge the low-voltage batteries 28a and 28b.

It should be noted that when the low-voltage batteries 28a and 28b are charged using the connectors 27a and 27b, the inter-bus connection switch 9 is in the off state.

At this time, it should be noted that it is necessary to equalize the power borne by each of the DC/DC converters 711 to 71n and each of the DC/DC converters 721 to 72m. As described above, the DC/DC converters 711 to 71n and the DC/DC converters 721 to 72m are connected in series on the DC power supply 25 side. Therefore, among the DC/DC converters 711 to 71n and the DC/DC converters 721 to 72m, the DC voltage of the smoothing capacitor 22a included in the light load tends to increase, and the DC voltage of the smoothing capacitor 22a included in the heavy load tends to decrease. When the difference in the DC voltage of the smoothing capacitor 22a becomes significant, the withstand voltage of the smoothing capacitor 22a or the SiC-MOSFET bridge 17a may be exceeded. Therefore, after grasping the charging power required by the low-voltage batteries 28a and 28b as loads, the number n of the DC/DC converters 711 to 71n to be allocated to the low-voltage battery 28a and the number m of the DC/DC converters 721 to 72m to be allocated to the low-voltage battery 28a are determined so that amounts of the output power of the DC/DC converters are substantially equal.

Hereinafter, a method for charging the high-voltage battery 30 in the configuration in FIG. 6, which is the gist of the present invention, will be described. The high-voltage battery 30 is a secondary battery that requires a higher charging voltage and a larger-capacity charging current than those of the low-voltage batteries 28a and 28b.

At this time, the state of each of the changeover switches 461 to 46n, the changeover switches 481 to 48n, the changeover switches 471 to 47m, the changeover switches 491 to 49m, the switches 50 to 52, and the inter-bus connection switch 9 is displayed in the color of hatching, and dark hatching is in the on state and pale hatching is in the off state. That is, regarding the n DC/DC converters 711 to 71n, since the changeover switches 461 to 46n to be connected to the DC bus 6a are in the on state and the changeover switches 481 to 48n to be connected to the DC bus 6b are in the off state, all the DC output sides of the DC/DC converters 711 to 71n are connected in parallel and are connected to the DC bus 6a.

On the other hand, regarding the m DC/DC converters 721 to 72m, since the changeover switches 471 to 47m to be connected to the DC bus 6a are in the off state and the changeover switches 491 to 49m to be connected to the DC bus 6b are in the on state, all the DC output sides of the DC/DC converters 721 to 72m are connected in parallel and are connected to the DC bus 6b.

Furthermore, since the inter-bus connection switch 9 is in the on state, the negative potential side of the DC bus 6a and the positive potential side of the DC bus 6b are connected.

As a result, a voltage in which the voltage of the DC bus 6a and the voltage of the DC bus 6b are connected in series is applied to the high-voltage battery 30.

As described above, in order to average the shared voltages on the input side, it is necessary to equalize all the input/output power of the DC/DC converters 711 to 71n and the DC/DC converters 721 to 72m.

At this time, assuming that the voltage applied to the high-voltage battery 30 is VDC, the output voltage of the DC/DC converters 711 to 71n is Vout1, and the output voltage of the DC/DC converters 721 to 72m is Vout2, a condition for equalizing the input/output power of the DC/DC converter is derived from Formulas (9) and (10).

Therefore, by setting the output voltage of the DC/DC converters 711 to 71n to $[n/(n+m)] \times VDC$ and setting the output voltage of the DC/DC converters 721 to 72m to $[m/(n+m)] \times VDC$, it is possible to equalize all the input/output power of the DC/DC converters 711 to 71n and the DC/DC converters 721 to 72m.

That is, the central control circuit 11 connects the DC buses 6a and 6b in series by the inter-bus connection switch 9, allocates the n DC/DC converters 711 to 71n to the DC bus 6a, allocates the m DC/DC converters 721 to 72m to the DC bus 6b, and performs connection. The central control circuit 11 controls the n DC/DC converters 711 to 71n and the m DC/DC converters 721 to 72m so that the voltage ratio of the DC buses 6a and 6b is n:m. The central control circuit 11 further turns on (closes) the switch 50 to connect the DC buses 6a and 6b connected in series by the inter-bus connection switch 9 to the high-voltage connector 29. Accordingly, the DC buses 6a and 6b connected in series can be connected to the high-voltage battery 30.

As a result, it is possible to achieve sharing of the power conversion device 100B for charging the high-voltage battery 30 and charging the low-voltage batteries 28a and 28b. Therefore, the manufacturing cost of the power conversion device 100B can be reduced, and the installation space can be reduced.

In addition, since the DC/DC converter in the present embodiment includes the circuit shown in FIG. 7, bidirectional operation is possible by setting the IGBT 18 to the on state and controlling the phase of the DAB circuit. Therefore, it is also possible to cope with discharge from the low-voltage batteries 28a and 28b and the high-voltage battery 30, and it is possible to perform discharge from the battery side to the DC power supply 25 side for use.

Modification

The present invention is not limited to the embodiments described above, and includes various modifications. For example, the above-described embodiments are described in detail for easy understanding of the present invention, and are not necessarily limited to those including all the configurations described. Some of the configurations of a certain embodiment can be replaced with configurations of another embodiment, and the configurations of another embodiment can also be added to the configurations of the certain embodiment. In addition, it is also possible to add, delete, and replace another configuration with respect to some of the configurations of each of the embodiments.

Some or all of the above-described configurations, functions, processing units, processing means, and the like may be implemented by hardware such as an integrated circuit, for example. Each of the above-described configurations, functions, and the like may be implemented by software by a processor interpreting and executing a program for implementing each function. Information such as a program, a table, and a file for implementing each function can be stored in a recording device such as a memory, a hard disk, and a solid state drive (SSD), or a recording medium such as a flash memory card and a digital versatile disk (DVD).

In each embodiment, the control lines and the information lines indicate those which are considered necessary for the description, and do not necessarily indicate all the control lines and the information lines on the product. Actually, it can be considered that almost all configurations are connected to each other.

Examples of modifications of the present invention include the following (a) to (h).

(a) In the first embodiment, the reactor 2a is provided between the AC power supply 1 and the power converter 12. However, the present invention is not limited thereto, and the reactor may be divided and provided in the input unit of each AC/DC converter.

(b) The circuit system of the AC/DC converters 311 to 31n and 321 to 32m is not limited to the AC/DC converter 311 having the full-bridge configuration and the bidirectional converter having the DAB configuration shown in FIG. 2, and may be another circuit system such as a phase shift system or an LLC resonance system.

(c) In addition, although the IGBT and the SiC-MOSFET are used as the power semiconductor devices used in the circuit, other power semiconductor devices may be used.

(d) The IGBT 18 does not need to be provided when the bidirectional operation is not performed. Furthermore, regarding the changeover switch, the switch, and the inter-bus connection switch 9, a power semiconductor may be used in addition to components having electrical contacts such as contactors and relays.

(e) In addition, the control system shown in FIG. 4 is an example, and a control algorithm having another configuration may be used.

(f) In addition, in the first and third embodiments, a method has been described in which n and m converters are allocated to the two DC buses, and the two DC buses are connected in series and connected to the load. However, as described in the second embodiment, three or more DC buses may be used. For example, in the case of three DC buses, n, m, and k cell converters are allocated, and their voltages are controlled to a ratio of n:m:k, so that the converted power of all the cell converters can be made the same.

(g) The method for connecting the power conversion device of the present invention and the electric vehicle may be a connection method using a pantograph or a connection method using a contactless power supply system in addition to the method using a cable as shown in the drawing. Further, the charging terminal may be integrated and switched inside.

(h) In addition, the power conversion device of the present invention can be applied not only to the charger of the electric vehicle and the charger of the secondary battery of the present embodiment but also to a power storage power conditioner having a system interconnection function and various power storage devices. Accordingly, in these electric apparatuses, the manufacturing cost can be reduced and the installation space can be reduced.

(i) The present invention is not limited to a single power conversion device, and may be a power conversion system in which a plurality of devices operate in cooperation.

REFERENCE SIGNS LIST

1 AC power supply (power supply)
1A three-phase AC power supply (power supply)
2a to 2c reactor
311 to 31n AC/DC converter (isolated cell converter)
321 to 32m AC/DC converter (isolated cell converter)
31u, 31v, 31w AC/DC converter (isolated cell converter)
32u, 32v, 32w AC/DC converter (isolated cell converter)
33u, 33v, 33w AC/DC converter (isolated cell converter)
34u, 34v, 34w AC/DC converter (isolated cell converter)
35u, 35v, 35w AC/DC converter (isolated cell converter)
36u, 36v, 36w AC/DC converter (isolated cell converter)
37u, 37v, 37w AC/DC converter (isolated cell converter)
411 to 41n changeover switch (DC path connection means)
431 to 43n changeover switch (DC path connection means)
421 to 42m changeover switch (DC path connection means)
441 to 44m changeover switch (DC path connection means)
461 to 46n changeover switch (DC path connection means)
481 to 48n changeover switch (DC path connection means)
471 to 47m changeover switch (DC path connection means)
491 to 49m changeover switch (DC path connection means)
41a to 41c changeover switch (DC path connection means)
42a to 42c changeover switch (DC path connection means)
43a to 43c changeover switch (DC path connection means)
44a to 44c changeover switch (DC path connection means)
45a to 45c changeover switch (DC path connection means)
46a to 46c changeover switch (DC path connection means)
47a to 47c changeover switch (DC path connection means)
50 switch (first load connection means)
51, 52 switch (second load connection means)
6a to 6c DC bus (DC path)
7a to 7c charging terminal
711 to 71n DC/DC converter (DC path connection means)
721 to 72m DC/DC converter (DC path connection means)
8a to 8c electric vehicle (load)
9 inter-bus connection switch
10 neutral point
11 central control circuit (control unit)
12, 12A, 12B power converter
13, 13A, 13B switching circuit
14 optical cable
15a, 15b control circuit (control unit)
16 IGBT bridge
17a, 17b SiC-MOSFET bridge
18 IGBT
19 high-frequency transformer
20a, 20b AC terminal
21a to 21d DC terminal
22a, 22b smoothing capacitor
23 large-capacity electric vehicle (load)
24 large-capacity charging terminal
25 DC power supply (power supply)
27a, 27b connector
28a, 28b low-voltage battery (load)
29 high-voltage connector
30 high-voltage battery (load)
81a to 81c ACR control block 82a, 82b multiplication block
83a, 83b AVR control block
100, 100A, 100B power conversion device

The invention claimed is:

1. A power conversion device comprising:
a plurality of isolated cell converters connected in series to a power supply;
two or more DC paths provided on an output side;
a DC path connection means configured to selectively connect each of the isolated cell converters to each of the DC paths;
a series connection means configured to connect in series two or more of the DC paths; and
a first load connection means configured to connect the DC paths connected in series by the series connection means to a load.

2. The power conversion device according to claim 1, further comprising a control unit configured to connect in series two of the DC paths, the control unit configured to allocate and connect a first number of n isolated cell converters and a second number of m isolated cell converters of the plurality of isolated cell converters to respective DC paths, the control unit configured to perform control so that a voltage ratio of the respective DC paths becomes n:m.

3. The power conversion device according to claim 1, further comprising a second load connection means configured to connect each of the DC paths to another load.

4. The power conversion device according to claim 1, wherein the load is a device including a secondary battery.

5. The power conversion device according to claim 4, wherein each of the isolated cell converters is a bidirectional AC/DC converter, and supplies power discharged from a load side to the power supply.

6. The power conversion device according to claim 5, wherein
the power supply is a three-phase high-voltage AC power supply, and
the isolated cell converters are connected in series to respective phases of the power supply in equal numbers through reactors.

7. The power conversion device according to claim 1, wherein the load is an electric vehicle.

8. The power conversion device according to claim 7, wherein each of the isolated cell converters is a bidirectional AC/DC converter, and supplies power discharged from a load side to the power supply.

9. The power conversion device according to claim 8, wherein
the power supply is a three-phase high-voltage AC power supply, and
the isolated cell converters are connected in series to respective phases of the power supply in equal numbers through reactors.

10. The power conversion device according to claim 1, wherein each of the isolated cell converters is a DC/DC converter.

11. The power conversion device according claim 1, wherein the series connection means is a switch that conducts one negative electrode and another positive electrode of the DC paths.

12. A power conversion system comprising:
a plurality of isolated cell converters connected in series to a power supply;
two or more DC paths provided on an output side;
a DC path connection means configured to selectively connect each of the isolated cell converters to each of the DC paths;
a series connection means configured to connect in series two or more of the DC paths; and
a first load connection means configured to connect the DC paths connected in series by the series connection means to a load.

13. A method for controlling a power conversion device, the method executing the steps of:
of a plurality of DC paths provided on an output side, connecting in series two or more of the DC paths by a series connection means;
of a plurality of isolated cell converters connected in series to a power supply, allocating and connecting a first number of n isolated cell converters and a second number of m isolated cell converters of the plurality of isolated cell converters to the respective DC paths by a DC path connection means;
controlling a voltage ratio of each of the DC paths to be n: m; and
connecting the DC paths connected in series to a load by a first load connection means.

* * * * *